United States Patent
Gray et al.

(10) Patent No.: US 11,738,328 B2
(45) Date of Patent: Aug. 29, 2023

(54) SINGLE-STEP SYNTHESIS OF CHEMISORPTION FIBER SORBENTS (CHEFS) FOR THE CAPTURE OF $CO_2$ AND REMOVAL OF WATER CONTAMINANTS

(71) Applicant: United States Department of Energy, Washington, DC (US)

(72) Inventors: McMahan L. Gray, Pittsburgh, PA (US); Fan Shi, Pittsburgh, PA (US); Shouliang Yi, Pittsburgh, PA (US); Walter Chris Wilfong, Clinton, PA (US); Qiuming Wang, Bridgeville, PA (US)

(73) Assignee: United States Department of Energy, Washington, DC (US)

( * ) Notice: Subject to any disclaimer, the term of this patent is extended or adjusted under 35 U.S.C. 154(b) by 139 days.

(21) Appl. No.: 17/245,092

(22) Filed: Apr. 30, 2021

(65) Prior Publication Data
US 2022/0347654 A1    Nov. 3, 2022

(51) Int. Cl.
| | | |
|---|---|---|
| *B01J 20/26* | (2006.01) | |
| *B01J 20/30* | (2006.01) | |
| *B01J 20/10* | (2006.01) | |
| *B01J 20/28* | (2006.01) | |
| *B01D 53/81* | (2006.01) | |
| *B01D 53/62* | (2006.01) | |

(52) U.S. Cl.
CPC ............ *B01J 20/262* (2013.01); *B01D 53/62* (2013.01); *B01D 53/81* (2013.01); *B01J 20/103* (2013.01); *B01J 20/28023* (2013.01); *B01J 20/3085* (2013.01); *B01D 2253/202* (2013.01); *B01D 2257/504* (2013.01); *B01J 2220/46* (2013.01)

(58) Field of Classification Search
CPC .. B01J 20/262; B01J 20/103; B01J 20/28023; B01J 20/3085; B01D 53/62; B01D 53/81
USPC ........................................................ 502/402
See application file for complete search history.

(56) References Cited

U.S. PATENT DOCUMENTS

| | | |
|---|---|---|
| 5,693,230 A | 12/1997 | Asher |
| 8,133,308 B2 | 3/2012 | Lively et al. |
| 9,289,730 B2 | 3/2016 | Bhandari et al. |
| 9,346,011 B2 | 5/2016 | Koros et al. |
| 2014/0206532 A1 | 7/2014 | Janke et al. |
| 2018/0100065 A1 | 4/2018 | Gray et al. |

OTHER PUBLICATIONS

Rownaghi, A.A., et al., Aminosilane-Gialled Zirconia-Titiania-Silica Nanoparticles/Torlon Hollow Fiber Composites for C02 Capture. ChemSusChem, 2016. 9(10): p. 1166-1177.

(Continued)

*Primary Examiner* — Anita Nassiri-Motlagh
(74) *Attorney, Agent, or Firm* — Aaron R. Keith; Michael J. Dobbs

(57) ABSTRACT

One or more embodiments relates to method for generating CHEFS having the steps of generating the CHEFS from a dope. One or more embodiments relates to a method for generating CHEFS having amine functional groups having the steps of generating a dope containing a BIAS with amine groups, at least one polymer, and at least one solvent; and forming CHEFS from the dope, wherein the generated CHEFS have no more than 30% amine loss compared to the BIAS.

16 Claims, 17 Drawing Sheets

(56) References Cited

OTHER PUBLICATIONS

Brennan, P.J., et al., Effect of Post-Functionalization Conditions on the Carbon Dioxide Adsorption Properties of Aminosilane-Grafted Zirconia/Titania/Silica-Poly(amide-imide) CompositeHollow Fiber Sorbents. Energy Technology, 2016: p. n/a-n/a.

Rownaghi, A.A., et al., In situ Formation of a Monodispersed Spherical Mesoporous NanosilicaTorlon Hollow-Fiber Composite for Carbon Dioxide Capture. ChemSusChem, 2015. 8(20): p. 3439-3450.

Fan, V., et al., CO2 Sorption Performance of Composite Polymer/Aminosilica Hollow Fiber Sorbents: An Experimental and Modeling Study. Industrial & Engineering Chemistry Research, 2015.

Rezaei, F., et al., Modeling of rapid temperature swing adsorption using hollow fiber sorbents. Chemical Engineering Science, 2014. 113(0): p. 62-76.

Labreche, V., et al., Poly(amide-imide)/Silica Supported PEI Hollow Fiber Sorbents for Postcombustion C02 Capture by RTSA. ACS Applied Materials & Interfaces, 2014. 6(21): p. 19336-19346.

Fan, V., et al., Evaluation of C02 adsorption dynamics of polymer/silica supported poly(ethylenimine) hollow fiber sorbents in rapid temperature swing adsorption. International Journal of Greenhouse Gas Control, 2014. 21(0): p. 61-71.

Labreche, V., et al., Post-spinning infusion of poly(ethyleneimine) into polymer/silica hollow fiber sorbents for carbon dioxide capture. Chemical Engineering Journal, 2013. 221(0): p. 166-175.

Lee, J.S., et al., Hollow fiber-supported designer ionic liquid sponges for post-combustion C02 scrubbing. Polymer, 2012. 53(25): p. 5806-5815.

Lively, R.P., et al., Hollow fiber adsorbents for C02 capture: Kinetic sorption performance. Chemical Engineering Journal, 2011. 171(3): p. 801-810.

Fan, V.; Rezaei, F.; Labreche, V.; Lively, R. P.; Kores, W. J.; Jones, C. W., Stability of amine-based hollow fiber C02 adsorbents in the presence of NO and S02. Fuel 2015, 160, 153-164.

Fan, V.; Labreche, V.; Lively, R. P.; Jones, C. W.; Keros, W. J., Dynamic C02 adsorption performance of internally cooled silica-supported poly(ethylenimine) hollow fiber sorbents. AIChE Journal 2014, 60, (11), 3878-3887.

Li, F. S.; Labreche, Y.; Lively, R. P.; Lee, J. S.; Jones, C. W.; Koros, W. J., Poly(ethyleneimine) infused and functionalized Torlon@-silica hollow fiber sorbents for post-combustion C02 capture. Polymer 2014, 55, (6), 1341-1346.

Li, F. S.; Qiu, W.; Lively, R. P.; Lee, J. S.; Rownaghi, A. A.; Koros, W. J., Polyethyleneimine-Functionalized Polyamide Imide (Torian) Hollow-Fiber Sorbents for Post-Combustion C02 Capture. ChemSusChem 2013, 6, (7), 1216-1223.

Labreche, Y., Fan, Y., Lively, R. P., Jones, C. W. and Koras, W. J. (2015), Direct dual layer spinning of aminosilica/Torlon® hollow fiber sorbents with a lumen layer for CO2 separation by rapid temperature swing adsorption. J. Appl. Polym. Sci., 132, 41845.

Babu, V. S.; Koros, W. J.; Fabrication of Solution-Cast Polyacrylonitrile Barriers for Hollow Fiber Sorbents Used in CO2 Removal from Flue Gas. Ind. Eng. Chem. Res. 2019, 58, 50, 22561-22568.

Rezaei, F.; Lively, R. P.; Labreche, Y.; Chen, G.; Koros, W.; Jones, C. W; Aminosilane-Grafted Polymer/Silica Hollow Fiber Adsorbents for CO2 Capture from Flue Gas. ACS Appl. Mater. Interfaces 2013, 5, 9, 3921-3931.

SINGLE-STEP SYNTHESIS OF CHEMISORPTION FIBER SORBENTS (CHEFS) FOR THE CAPTURE OF $CO_2$ AND REMOVAL OF WATER CONTAMINANTS

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

Embodiments relate to chemisorption fiber sorbents and methods for producing same. More specifically embodiments relate to fiber sorbents comprising basic immobilized amine sorbents and methods for producing same.

BACKGROUND $CO_2$ levels in the atmosphere are a pressing issue. An urgent need exists for limiting the release of further $CO_2$ into the atmosphere, Point sources for $CO_2$ release are primary targets for technologies that prevent $CO_2$ release by scrubbing the $CO_2$ from gaseous effluent of the point source. The most significant of such point sources are coal and natural gas power plants.

One route to removing $CO_2$ from power plant effluent is through the use of a sorbent that contacts $CO_2$-laden flue gas before it exits a plant, the $CO_2$ adsorbing onto the sorbent. A common example of these sorbents is basic immobilized amine sorbents ("BIAS" hereinafter). BIAS sorbents generally comprise polyamines immobilized on a substrate via a crosslinker. These sorbents have the ability to remove CO2 from gas streams by adsorbing the $CO_2$ using temperature swing adsorption and pressuring swing adsorption. Said sorbents can be regenerated to remove the adsorbed $CO_2$.

Conventional BIAS sorbents, however, have a large heat of $CO_2$ adsorption and require efficient heat redistribution from the sorbent bed into any associated $CO_2$ capture process. Therefore, a low cost and energy efficient $CO_2$ sorbent is needed.

Current research efforts involve generating BIAS that are distributed in fibers, chemisorption fiber sorbents ("CHEFS" hereinafter). These sorbents are promising for use in temperature swing adsorption, rapid temperature swing adsorption, pressure swing adsorption, and combinations thereof to remove $CO_2$ and other target moieties from gaseous effluent. State of the art CHEFS, however, require several steps to synthesize and are expensive to make. Also, current CHEFS have undesirable amine distribution.

A need in the art exists for a single-step method for generating CHEFS that maintain their amine functionality.

SUMMARY

This disclosure provides CHEFS containing amine functional groups and a single-step method for producing same. These CHEFS are suitable for adsorbing $CO_2$ from gaseous streams and for the separation of metals from liquid solutions. The method for generating the invented CHEFS generally comprises direct spinning a dope, wherein the dope comprises a BIAS, at least one polymer, and at least one solvent, and wherein the BIAS comprises a polyamine crosslinked and immobilized within a silica pore via a crosslinker, wherein the crosslinker comprises an epoxysilane, a polyepoxide, an aminosilane, an acrylamide based crosslinker, and combinations thereof. The BIAS attaches to the silica through hydrogen-bonding or covalent attachment via the crosslinker. The method for producing CHEFS disclosed herein generates CHEFS that retain amine functional groups and do not require post-generation amine functionalization. A salient feature of the invention is that it provides a single-step method for direct-spinning CHEFS from starting materials that are pre-functionalized with amine groups, the produced CHEFS experiencing less than 30% amine loss from the starting materials.

BRIEF DESCRIPTION OF THE DRAWINGS

The invention together with the above and other objects and advantages will be best understood from the following detailed description of the preferred embodiment of the invention shown in the accompanying drawings, wherein:

FIGS. 12A-128 are scanning electron microscopy images of CHEFS Hollow 53a, in accordance with the features of the present invention;

DETAILED DESCRIPTION

Figure 1:
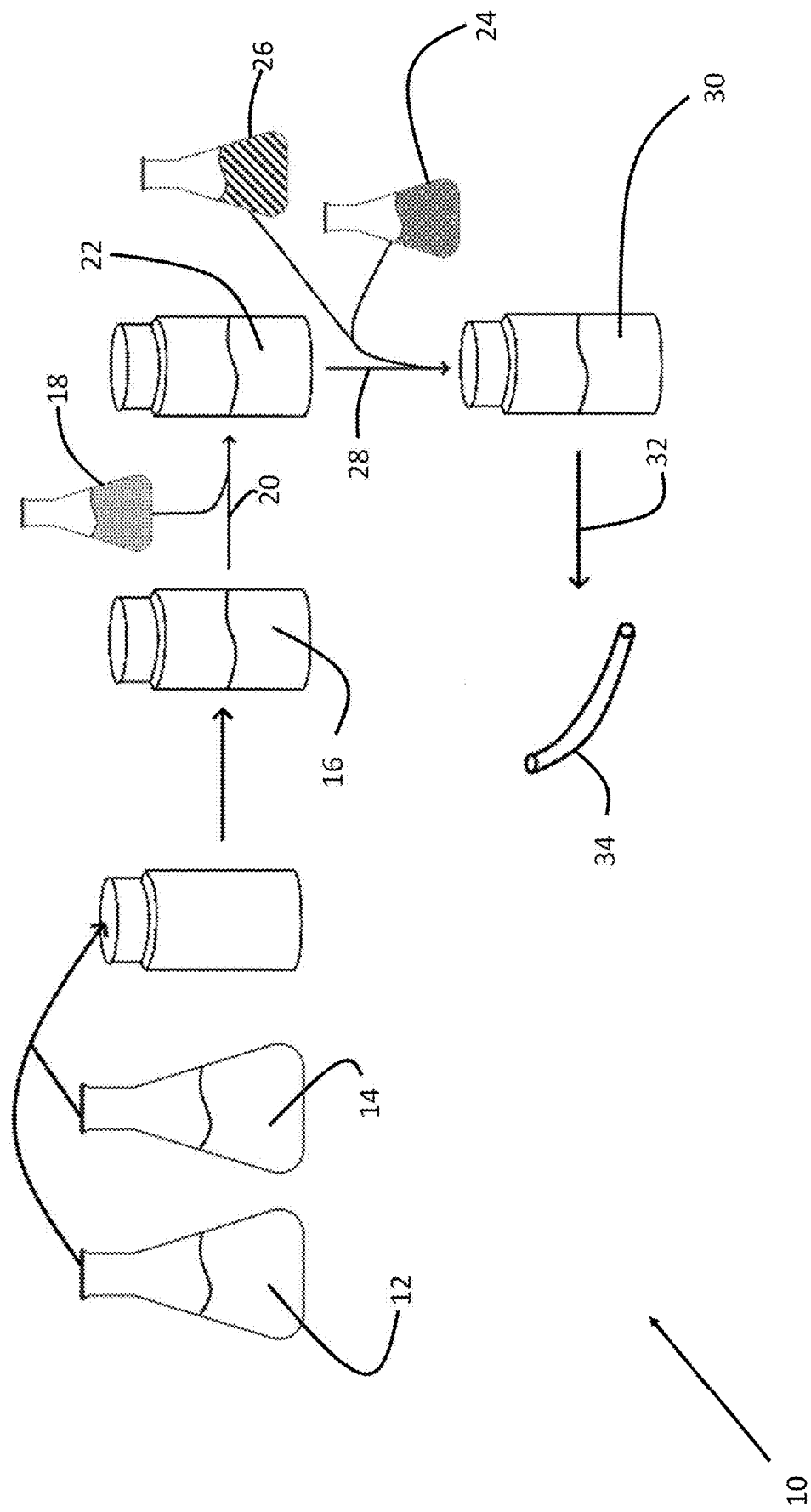
FIG. 1 depicts a schematic for generating CHEFS, in accordance with the features of the present invention.

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

One or more embodiments relate to a chemisorption fiber sorbent ("CHEFS" hereinafter) and method for making the same. Specifically, the inventors have discovered a single-step synthesis procedure for making CHEFS fiber, wherein the fiber comprises BIAS, and at least one polymer. In an embodiment, the sorbent is formed in a single-step procedure comprising direct spinning a dope comprising BIAS, one or more polymers, and one or more solvents, wherein the BIAS comprises a polyamine species crosslinked and immobilized within a silica pore via a crosslinker. As used herein, crosslinker comprises a species used to crosslink a polyamine and or bond the polyamine to a substrate such as silica through covalent bonding or hydrogen bonding. In an embodiment, the crosslinker comprises an epoxysilane, a polyepoxide, an aminosilane, an acrylamide based crosslinker, and combinations thereof. In an embodiment, the polyamine species is a pre-functionalized, crosslinked polyethylenimine.

The invented-single step procedure generates CHEFS superior to prior art sorbent fibers. The invented CHEFS are regenerable and suitable for capture of $CO_2$ through temperature swing adsorption ("TSA" hereinafter), pressure swing adsorption ("PSA" hereinafter), and rapid temperature swing adsorption ("RTSA" hereinafter). Said invented CHEFS can be used to retrofit existing $CO_2$ sources to scrub $CO_2$ from emissions. In another embodiment, the invented CHEFS are used to recover heavy metals. critical minerals, as defined by the U.S. Department of the Interior, and combinations thereof from waste streams.

In an alternative embodiment, the invented CHEFS fibers are suitable for capturing any acidic gas or amine reactive compound in a gaseous stream. Exemplary acidic gasses and amine reactive compounds include HCl, $SO_2$, $H_2S$, $H_2SO_4$, $NO_2$, formaldehyde, glutaraldehyde, and combinations thereof.

In another embodiment, the invented CHEFS fibers are suitable for capturing heavy metals or critical minerals as defined by the U.S. Department of the interior. from a liquid.

Composition Detail

The invented CHEFS generally comprise 50-95 wt % BIAS and 5-50 wt % polymer.

The BIAS generally comprises approximately 60 wt % silica and 40 wt % of a combination of polyamine and a crosslinker, wherein the crosslinker comprises an epoxysilane, a polyepoxide, an aminosilane, an acrylamide based crosslinker, and combinations thereof. Any variety of silica, polyamine, polyepoxide, epoxysilane, acrylamide based crosslinker, or epoxysilane are suitable for use with the instant invention. An exemplary BIAS comprises silica particles having an average particle size of 25 μm (available from PQ Corporation of Malvem, Pa.) and polyethylenimine wherein the polyethylenimine is a crosslinked polyethylenimine Mw=800 ($PEI_{800}$; available from Sigma-Aldrich)/ N—N-diglycidyl-4-glycidyloxyaniline (polyepoxide, 3 reactive groups; available from Sigma-Aldrich)-0.43/1 mixture.

THE BIAS used and described herein comprises a silica as a support for polyamines. Silica is an exemplary support substrate and is not meant to be limiting. Any material capable of supporting polyamine sorbents is suitable as the support substrate in a BIAS. Additional suitable support substrates for a BIAS include zeolite, alumina, zirconia, titania, activated carbon, char, clay, and porous polymer particles like porous polyvinyl alcohol, metal organic frameworks (MOF), polymers of intrinsic mesoporosity (PIM), and benzimidazole-linked polymers (BILP), and combinations thereof.

In an embodiment, the BIAS used in the instant single-step method comprises a silica with an immobilized polyamine combined with and crosslinked by a crosslinker. The polyamine may be a polyethylenimine having a Mw ranging from about 400 to about 1,000,000. Any polyethylenimine having a Mw from about 400 to about 1,000,000 is suitable. Exemplary polyethylenimines include polyethylenimine (Mw=400 to 25,000), ethylenediamine, diethylenetriamine, triethylenetetramine, tetraethylenepentamine, pentaethylenehexamine, hexaethyleneheptamine, polypropylenimine, 1,3-cyclohexanebis(methylamine), 4,4'-Methylenebis(cyclohexylamine), 3,3'-Methylenedianiline, o-phenylenediamine, m-phenylenediamine, p-phenylenediamine, Tris(2-aminoethyl)amine, p-Xylylenediamine, 4-Chloro-o-phenylenediamine, N,N'-Dimethyl-1,3-propanediamine, N,N-Diphenyl-p-phenylenediamine, N,N'-Diisopropyl-1,3-propanediamine, polyvinyl amine, poly(allylamine), and combinations thereof.

The BIAS used in the instant invention comprises a crosslinker used to immobilize a polyamine in the pores of silica or other substrate. Suitable crosslinkers include epoxysilanes, polyepoxides, aminosilanes, acrylamide-based crosslinkers, and a combination thereof. Any epoxysilane capable of crosslinking polyamines is suitable for use in the BIAS used in the instant invention. Exemplary epoxysilanes include 2-(3,4-epoxycyclohexyl)ethyltriethoxysilane (ECTMS), 5,6-epoxyhexyltriethoxysilane, tetrakis[(epoxycyclohexypethyl]tetramethylcyclotetrasiloxane, epoxypropoxypropyl terminated polydimethylsiloxane, (epoxycyclohexylethyl)methylsiloxane]dimethylsiloxane copolymer, 1,3-bis[2-(3,4-epoxycyclohexyl)ethyl]tetramethyldisiloxane, (epoxypropyl)heptaisobutyl-t8-silsesquioxane, epoxypropoxypropyl)methylsiloxane]-dimethylsiloxane, mono-(2,3-epoxy)propylether terminated polydimethylsiloxane, epoxycyclohexylethyl terminated polydimethylsiloxane, and combinations thereof.

In alternative embodiments, the crosslinker is an aminosilane. Any silane capable of crosslinking polyamines is suitable for use in the BIAS used in the instant invention. Exemplary aminosilanes include 3-aminopropyltriethoxysilane, 3-(2-Aminoethylamino)propyldimethoxymethylsilane, 3-[2-(2-Aminoethylamino)ethylamino]propyltrimethoxysilane, Bis[3-(trimethoxysilyl)propyl]amine, N-[3-(Trimethoxysilyl)propyl]aniline, and 1-[3-(Timethoxysilyl)propyl]urea; (3) Incorporating different silane-derived linkers, such as (3-Bromopropyl)timethoxysilane, (3-Iodopropyl)trimethoxysilane, (3-Mercaptopropyl)trimethoxysilane, (3-Chloropropyl)trimethoxysilane, 3-(Trimethoxysilyl)propyl methacrylate, 3-Glycidyloxypropyl)trimethoxysilane, and combinations thereof.

In other embodiments, the crosslinker is a polyepoxide. Any polyepoxide capable of crosslinking polyamines is suitable for use in the BIAS used in the instant invention. Exemplary polyepoxides include bisphenyl A diglycidyl ether, N—N-diglycidyl-4-glycidyloxyanaline, 4,4'-methylenebis(N,N-diglycidylaniline), triglycidyl trimethylolpropane ether, and combinations thereof. Suitable polyepoxides include any number of epoxides per molecule including diepoxides, triepoxides, tetraepoxides and more.

In another embodiment, the crosslinker is an acrylamide-based crosslinker. Any acrylamide is capable of crosslinking a polyamine is suitable for use in the BIAS used in the instant invention. Suitable acrylamide-based crosslinkers include acrylamide, N,N'-Methylenebis(acrylamide), and combinations thereof.

In an embodiment, the invented CHEFS comprise preferably between approximately 50 and approximately 95 wt % BIAS, more preferably between approximately 60 and approximately 85 wt % BIAS, and typically between approximately 70 and approximately 80 wt % BIAS. The CHEFS also comprise preferably between approximately 5 to approximately 50 wt % polymer, more preferably between approximately 15 to approximately 40 wt % polymer, and typically between approximately 20 to approximately 30 wt % polymer.

In an embodiment, the dope used to form the CHEFS includes one or more polymers used as pore formers that are substantially removed from the final, dried CHEFS. Any polymer that can form a porous structure in the final dried CHEFS is suitable. An exemplary polymer is Polyvinylpyrrolidone ("PVP" hereinafter). An exemplary PVP is MW=55000. This is exemplary and not meant to be limiting. Any PVP can be used in the instant invention, including PVP that is substituted, crosslinked, and/or functionalized. Other suitable pore formers include surfactants such as octylphenol ethoxylates In an embodiment, the invented CHEFS include cellulose acetate ("CA" hereinafter). Any CA is suitable for use in the instant invention. An exemplary and suitable CA has a molecular weight of 50,000. Alternative embodiments may also include with cellulose acetate: polyamide-imide, polyetherimide, and combinations thereof. These alternatives to cellulose acetate may also be used separately from cellulose acetate.

Synthesis Detail

Generation of the BIAS used in the instant invention and the composition thereof is disclosed in U.S. Patent Publication No. 2018/0100065 A1 to Gray et al., the contents of which are herein incorporated by reference.

The invented CHEFS typically comprise fibers extruded from a dope. In an embodiment, a single-step procedure is used to direct-spin a dope containing BIAS, one or more polymers, and solvents into a fiber. The invented fibers can be either solid or hollow.

Generally, the method for synthesizing the invented CHEFS comprises generating a dope, and extruding the CHEFS fibers from the generated dope. In an embodiment, the dope comprises a pre-functionalized BIAS, at least one polymer, and at least one solvent. The extruding step comprises direct spinning. In an embodiment, a pre-functionalized BIAS comprises a substrate with an immobilized polyamine combined with and crosslinked by a crosslinker (epoxysilane, aminosilane, polyepoxide, acrylamide-based crosslinker).

FIG. 1 shows a schematic 10 for a single-step preparation of an exemplary embodiment of the invented sorbents. First, between 8 and 9 g of NMP 12 are mixed with between 1 and 2 g of deionized water 14 to generate 10 g of a solvent solution 16. Next, between approximately 0.3 g and approximately 0.7 g of PVP 18 is added to the solvent solution 16 that is rolled 20 for two to three hours to generate a pre-dope 22. Then, between approximately 2 and approximately 4 g of BIAS 24 along with between approximately 1.2 g and 1.8 g of CA 26 are added to the pre-dope 22, and the mixture mixed vigorously 28 for 24 to 72 hours to generate the final dope 30. Once the dope 30 is finalized, the invented CHEFS 34 are generated through direct spinning 32. Generated CHEFS 34 are then quenched and soaked in deionized water to remove the NMP and PVP. Subsequently, the fibers are further solvent exchanged in water-soluble non-solvent (i.e. methanol, ethanol, isopropanol, n-propanol, butanol or other solvent), then alcohol-soluble non-solvent (i.e. hexane, heptane, cyclohexane, pentane, isooctane), then finally dried in air overnight at ambient conditions or dried in an oven at between 30° C. and 100° C.

Solvent exchange comprises soaking the generated CHEFS in a water-soluble non-solvent for a period of between approximately 0.1 and 24 hours, followed by soaking the CHEFS in alcohol-soluble non-solvent for a period of between approximately 0.1 and approximately 24 hours.

Figure 2:
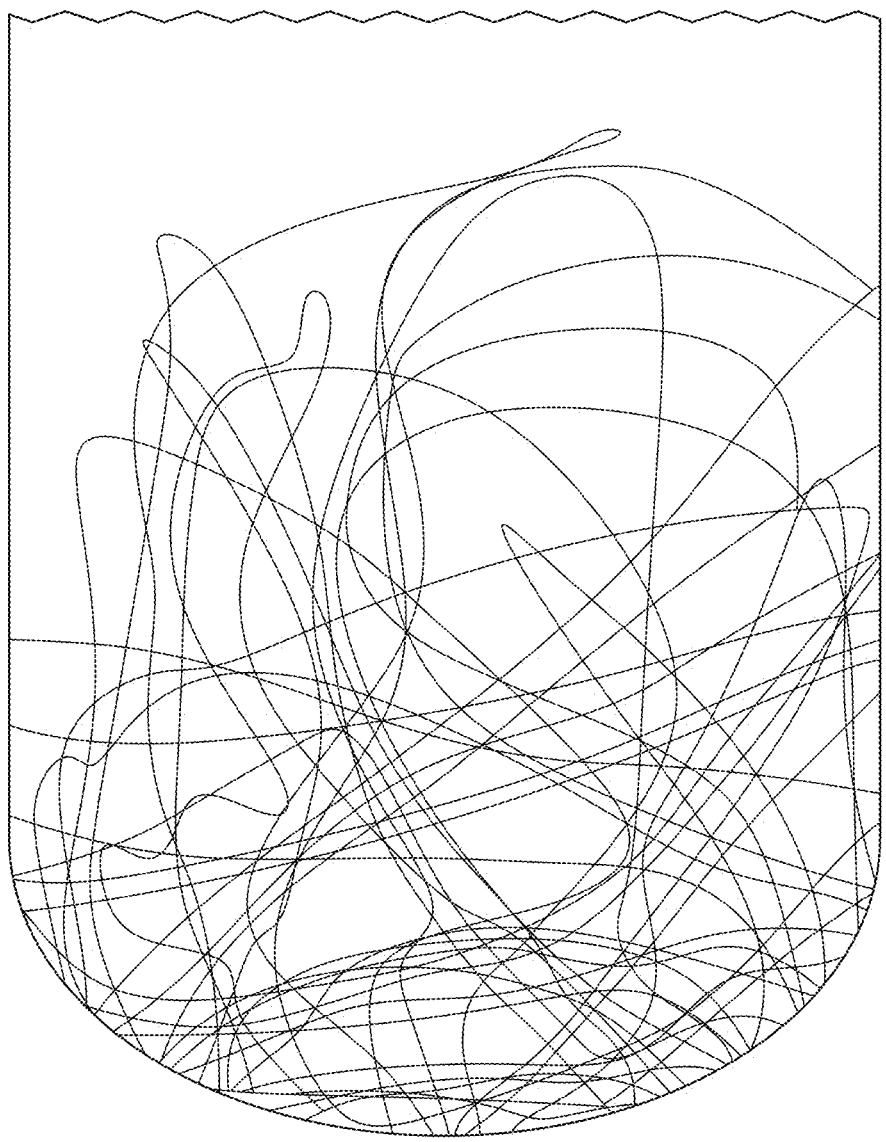
FIG. 2 is a photograph of the invented CHEFS, in accordance with the features of the present invention.

FIG. 2 is a photograph of the CHEFS 34 generated from the described procedure. The CHEFS 34 are elongated fibers having an off-white color.

The solvents used herein are described as NMP and water. Suitable NMP/water solutions include solutions between 10% water in 90% NMP and 20% water in NMP. These are exemplary and not meant to be limiting. Any solvents suitable for preparing the dope of the instant invention are suitable. Other suitable solvents for use in the instant invention include methyl formate, methyl acetate, ethyl acetate, ethyl lactate, nitromethane, acetonitrile, dimethylformamide, tetrahydrofuran, dioxane, methylene chloride, chloroform, tetrachloroethane, and combinations thereof.

As described above, the final CHEFS are generated through direct spinning of the dope. In an embodiment, CHEFS are extruded using a syringe. An 18 gauge needle is suitable for extruding solid CHEFS. Alternatively, a spinning head (spinneret) is suitable for extruding a hollow CHEFS.

Direct spinning of BIAS by syringe involves slowly extruding the CHEFS dope solution from a needle tip into a non-solvent/precipitation water bath at a pre-determined air gap (distance between needle and water bath) and temperature to induce precipitation of the fiber into a non-hollow, solid structure. Direct spinning by a process called dry-jet, wet quench spinning constitutes co-extrusion of a CHEFS dope solution and a bore fluid, like NMP/$H_2O$, through a spinneret into a non-solvent (water) to generate a hollow fiber. Air gap; dope and bore flow rates; quench temperature; spinneret temperature; and drum uptake rate (cm/min) can be varied to optimize the process. Subsequent to solvent exchange and drying of the hollow fiber, a bore-side (annulus) lumen layer of polymer, such as crosslinked latex polychloroprene, polyacrylonitrile, or poly(amide-imide)

(PAI), can be used to coat the lumen of a hollow fiber to create a solid barrier to enable the flowing of heating or cooling heat transfer fluid during rapid temperature swing adsorption operation. The lumen layer coating step comprises flowing a polymer solution through the bore side, then heating to remove solvent and crosslink the lumen layer polymer matrix. In another embodiment, the polymer lumen layer can be co-spun along with the polymer-BIAS fiber using a modified spinneret; bore fluid, such as polyethylenglycol (PEG)/water/NMP or PEG alone; and lumen dope, such as PAI/NMP/water. These fibers are prepared by co-spinning the CHEFS dope, bore solution, and lumen dope solution; performing solvent exchange; then drying. Subsequently, a thin layer of polydimethylsiloxane (PDMS) and/or polyaramid to seal skin defects in the lumen layer. FIG. 2 shows a photograph of an extruded CHEFS fiber 40. Exemplary direct-spin processes are described in ACS Appl. Mater. Interfaces 2013, 5, 3921-3931 and Eng. 2019, 7, 5264-5273 and J. APPL. POLYM. SCI. 2015, DOI: 10.1002/APP.41845 for dual spinning of fiber with lumen layer, the contents of which are incorporated by reference herein.

A salient feature of the invention is the generation of either solid or hollow CHEFS fibers. Hollow fibers within an RTSA system have high surface area/volume ratio, facilitating superior $CO_2$ uptake and release kinetics and heat transfer during adsorption and desorption, respectively. These enable faster $CO_2$ capture than conventional hollow fiber membranes that utilize slower diffusion mechanisms to capture $CO_2$, and faster cycling times than those of a system containing packed particle sorbent within a packed bed. Hollow CHEFS feature faster $CO_2$ uptake/release kinetics and more suitability for the RTSA set-up than conventional solid sorbent fibers.

Another salient feature of the invention is that the CHEFS do not require post-spinning amine functionalization unlike prior art methods. Yet, the CHEFS herein are still amenable to post-functionalization.

The described method is exemplary and not meant to be limiting. Any of the reagents or materials can be substituted for suitable alternatives. A person having ordinary skill in the art can readily discern that any part in the procedure can be substituted or slightly varied to achieve the same results.

A salient feature of the invention is the use of a sorbent comprising a BIAS that is pre-functionalized with amine as a reagent in the single-step synthesis procedure to produce CHEFS fibers shown in FIG. 1 and described above. Prior art methods are unable to direct spin CHEFS fibers starting with amine-functionalized sorbents without losing all or mostly all of the amine groups. Instead, state of the art methods, spin fibers that contain no amine groups only to subsequently functionalize those fibers through the addition of amine groups. Such a post-preparation amine functionalization of fibers results in an uneven distribution of unstable amine and other functional groups throughout the fiber, making for both unreliable $CO_2$ mass transfer and low $H_2O$ and steam stability.

Surprisingly and unexpectedly, the inventors have discovered that the inclusion of a crosslinker (polyepoxide, epoxysilane, aminosilane, acrylamide-based crosslinker) in a BIAS sorbent serves to crosslink the polyamine, resulting in polyamines that are stabilized within the silica pores of a generated BIAS. Specifically, in an embodiment, the cross-linkers crosslink the polyamine and generate covalent —C—N-bonds between adjacent amine groups of separate polyamine molecules, along with pendant hydroxyl groups (—OH) the provide added stability by hydrogen bonding with neighboring polyamines. For example, an exemplary BIAS sorbent uses N—N-diglycidyl-4-glycidyloxyaniline (a triple epoxide) to crosslink Mw=800 PEI that is then immobilized on silica. In alternative embodiments, cross-linkers like aminosilanes can self-react through their methoxy, (—OCH$_3$) ethoxy (—OCH$_2$CH$_3$), etc. groups to generate a secondary polymer network comprised of Si—O—Si linkages and Si—OH (silanol) groups. The Si—OH groups hydrogen with the polyamine to provide leach resistance. Furthermore, the aminosilane provides added amine sites for $CO_2$ capture. In an embodiment more preferred to that using only an aminosilane crosslinker, a dual crosslinker network containing aminosilane plus epoxysilane or polyepoxide can be used. Therein, the epoxysilane and aminosilane co-polymerize that both stabilizes the polyamine and captures $CO_2$. Such a BIAS sorbent features amine groups that are stable within the pores of the silica support and resistant to corrosion and dissolution during the generation of the CHEFS fibers of the instant invention. As a result, the single-step synthesis method discovered by the inventors uses an already amine functionalized sorbent (BIAS) that retains amine groups after processing into a CHEFS fiber through direct spinning. Moreover, the CHEFS fibers generated using the pre-amine functionalized sorbents of the instant invention provide a facile, rapid, and cheap synthesis method compared to prior art methods requiring multiple steps.

Characterization and Performance Detail

Four dope compositions were prepared according to the preparation procedure above. The compositions of these dope preparations are shown in Table 1, the table giving each preparation a reference number and providing the gram weight of each component in each preparation. The BIAS used in the test fibers was generated according to the procedure found in U.S. Patent Publication No. 2018/0100065 A1 to Gray et. al and was 60 wt % silica and 40 wt % of a 0.43:1 combination of PEI Mw=800 polyamine and N—N-diglycidyl-4-glycidyloxyaniline tri-epoxide cross-linker.

TABLE 1

| FIBER | CA | PVP | NMP | H2O | BIAS |
|---|---|---|---|---|---|
| A1 | 1.3824 | 0.5835 | 8.862 | 1.14 | 2.1612 |
| A2 | 1.7894 | 0.7032 | 8.755 | 1.25 | 2.8051 |
| A3 | 1.2485 | 0.7016 | 8.512 | 1.50 | 2.8095 |
| A4 | 1.5534 | 0.3921 | 8.836 | 1.16 | 4.0560 |

Figure 3:
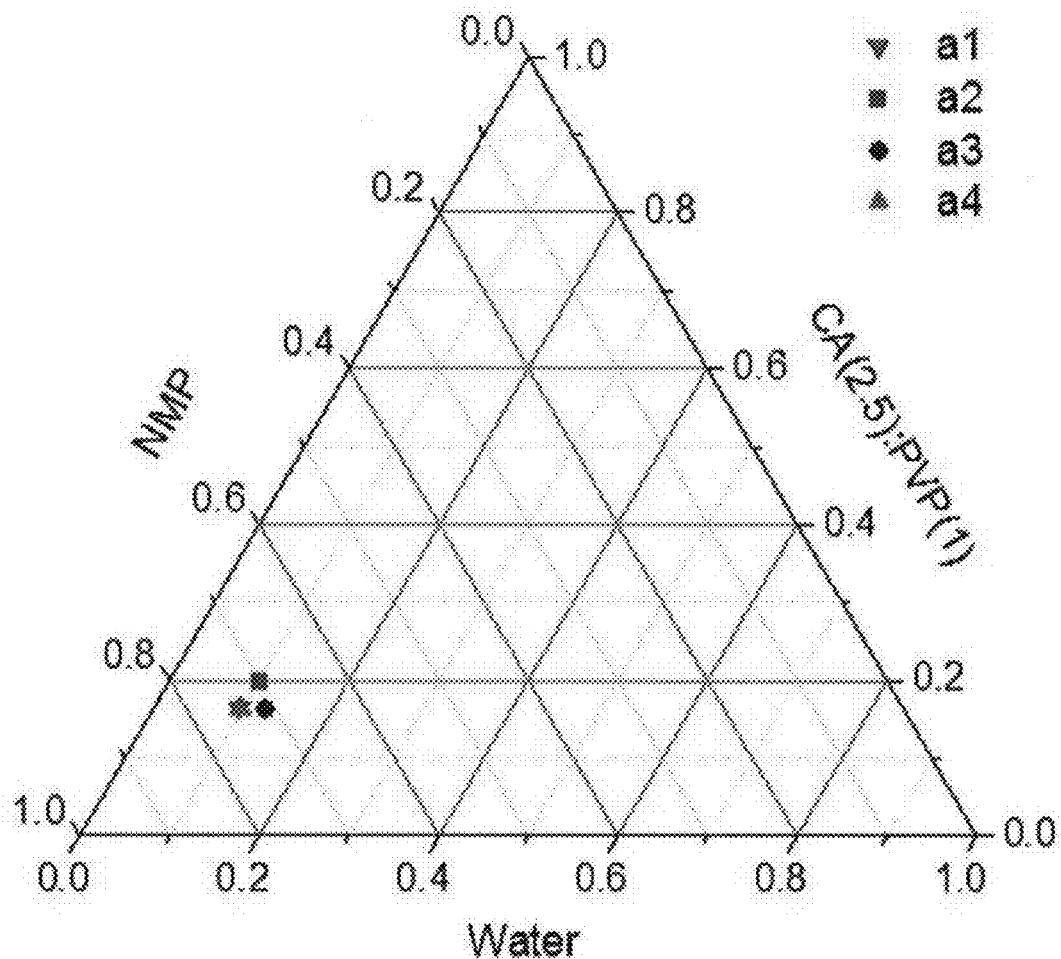
FIG. 3 is a ternary phase diagram of four dopes used to extrude CHEFS, in accordance with the features of the present invention.

After preparation, dopes A1, A2, and A3, formed a single, homogenous phase. A4 featured separated phases. A1 showed the lowest viscosity followed by A3. Dopes A2 and A4 were more highly viscous compared to A1 and A3. FIG. 3 shows a ternary phase diagram 42 for the four dope compositions shown in Table 1.

Figure 4:
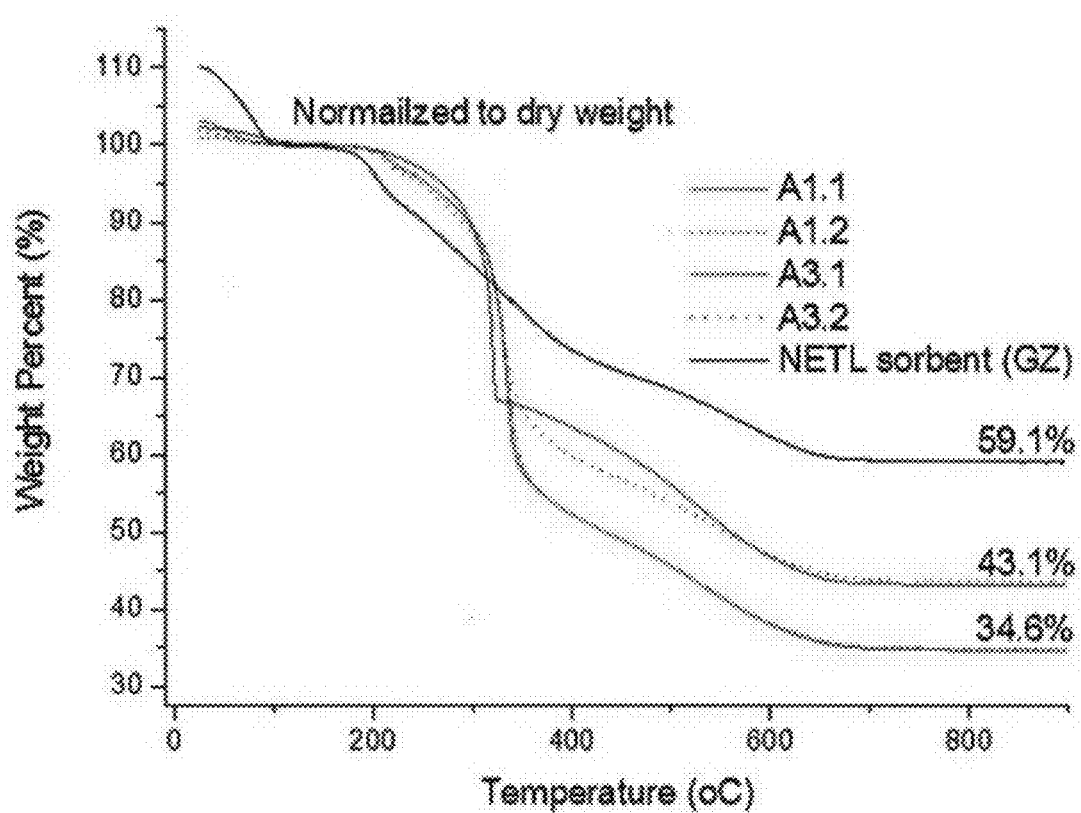
FIG. 4 is a graph showing the results of thermal gravimetric analyses to determine silica loadings, in accordance with the features of the present invention.

After preparation of CHEFS fibers for each of the four dope formulas shown in Table 1, thermal gravimetric analysis ("TGA" hereinafter) performed at 900° C. was used to determine Silica loadings for each dope formula. TGA results are shown in FIG. 4. The experimental silica loadings found in FIG. 4 correspond closely with target bias loadings calculated using Equation 1 as follows:

$$\text{Target SiO}_2 = \frac{\text{grams SiO}_2}{\text{grams } CA + \text{grams } BIAS} \qquad \text{Equation 1}$$

The stability of CHEFS fibers A1 and A3 were tested in two different solvents using solvent exchange procedures, including water exchange and methanol and hexane exchange. Table 2, below, gives the results of the TGA results shown in FIG. 4 and calculated using Equation 1. Table 2 also show the results of the solvent exchange procedures on CHEFS fibers A1 and A3 where water exchange is shown as Ax-1, and methanol and hexane exchange are shown as Ax-2, where x=1 or 3. Solvent exchange was performed by soaking directly spun fibers in multiple changes of water for 1 week to replace NMP with $H_2O$; then soaking in 2 batches of MeOH, 30 min each, to displace $H_2O$; then soaking in 2 batches of hexane, 30 min each, to displace MeOH.

TABLE 2

| FIBER | Target SiO$_2$ Loading (%) | SiO$_2$ Loading from TGA (%) |
|---|---|---|
| A1-1 | 36.0 | 34.6 |
| A1-2 | 36.0 | 34.6 |
| A3-1 | 40.9 | 43.1 |
| A3-2 | 40.9 | 43.1 |

Figure 5A:
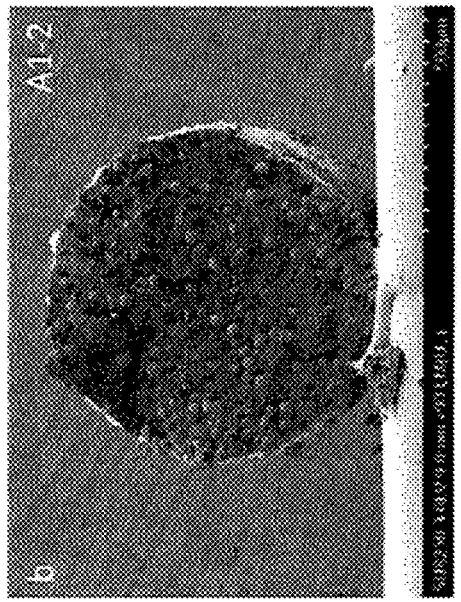
FIGS. 5A-5D are scanning electron microscopy images of CHEFS fibers generated using the instant invention, in accordance with the features of the present invention.
Figure 5B:
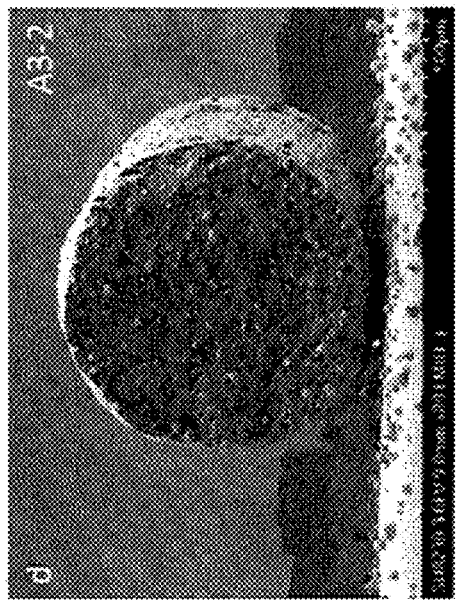
Figure 5C:
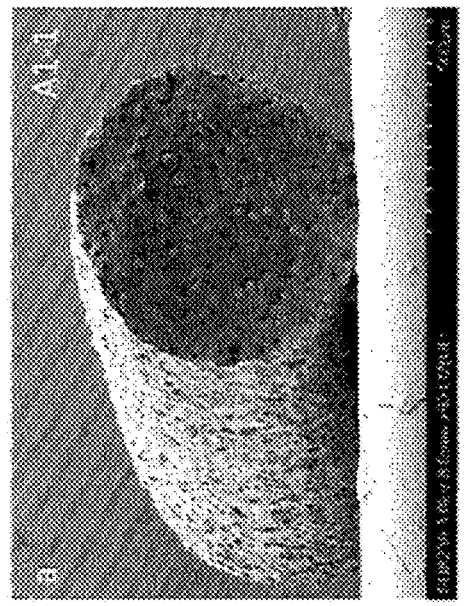
Figure 5D:
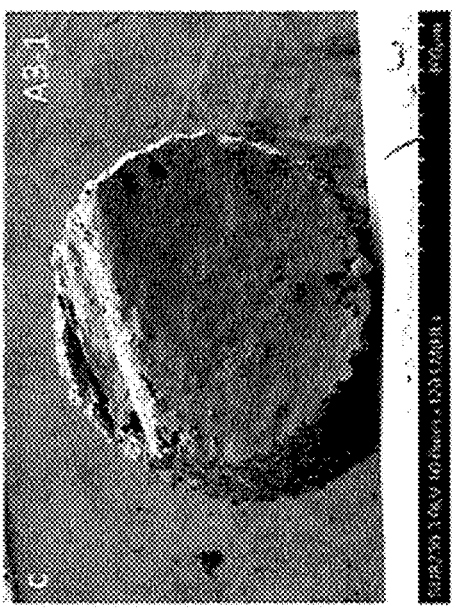
Figure 6A:
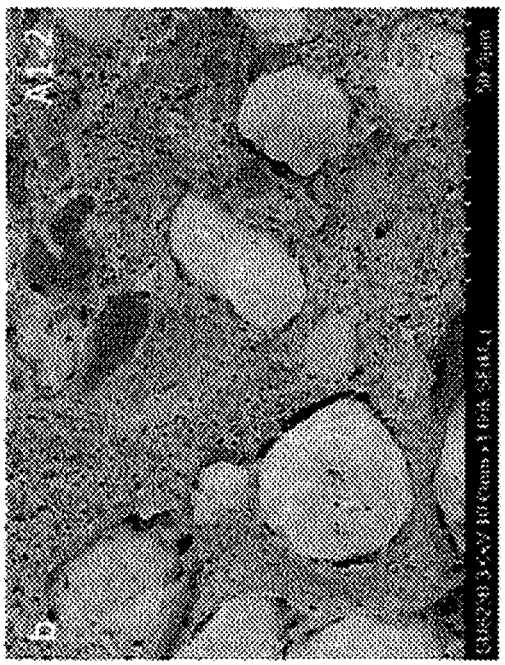
FIGS. 6A-6D are scanning electron microscopy images of CHEFS fibers generated using the instant invention, in accordance with the features of the present invention.
Figure 6B:
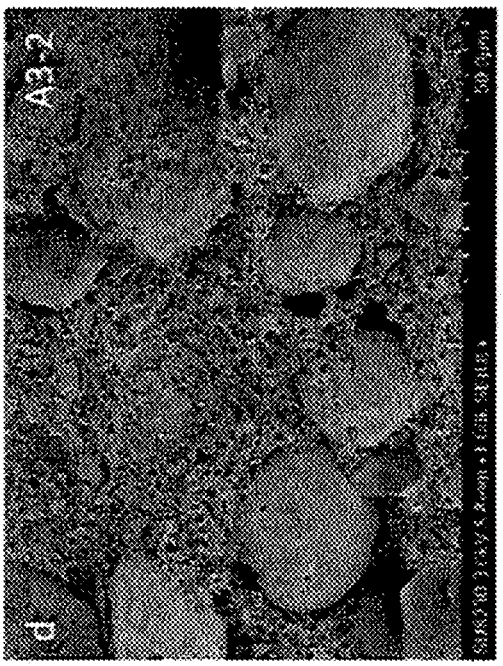
Figure 6C:
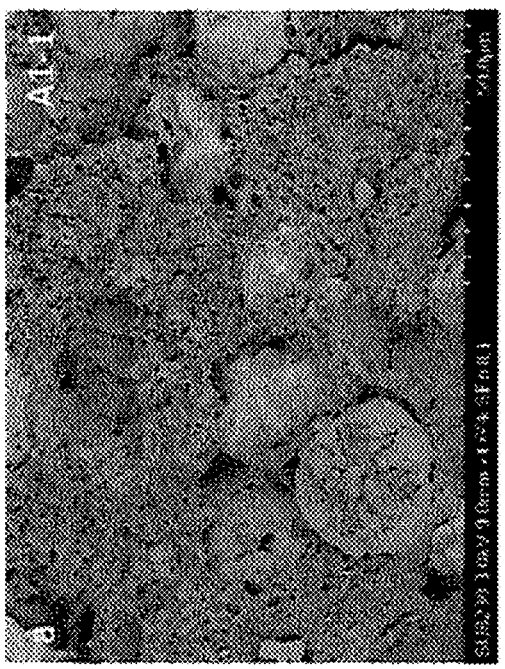
Figure 6D:
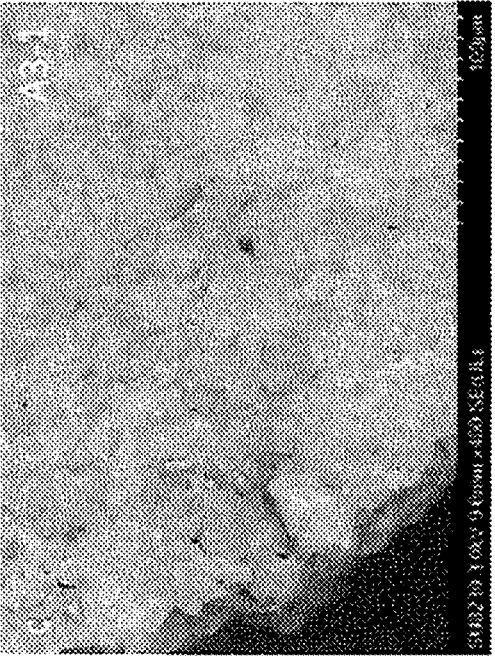

Scanning Electron Microscopy images of the morphology of the cross-sectional area of the CHEFS fibers described in Table 2 are shown in FIGS. 5A-D with enlarged images shown in FIGS. 6A-D. As shown in FIGS. 5B, 5D, 6B, and 6, the CHEFS fibers maintained porosity after methanol and hexane exchange tests. Similarly, fiber A1 maintained porosity with water exchange as shown in FIGS. 5A and 6A.

Figure 7:
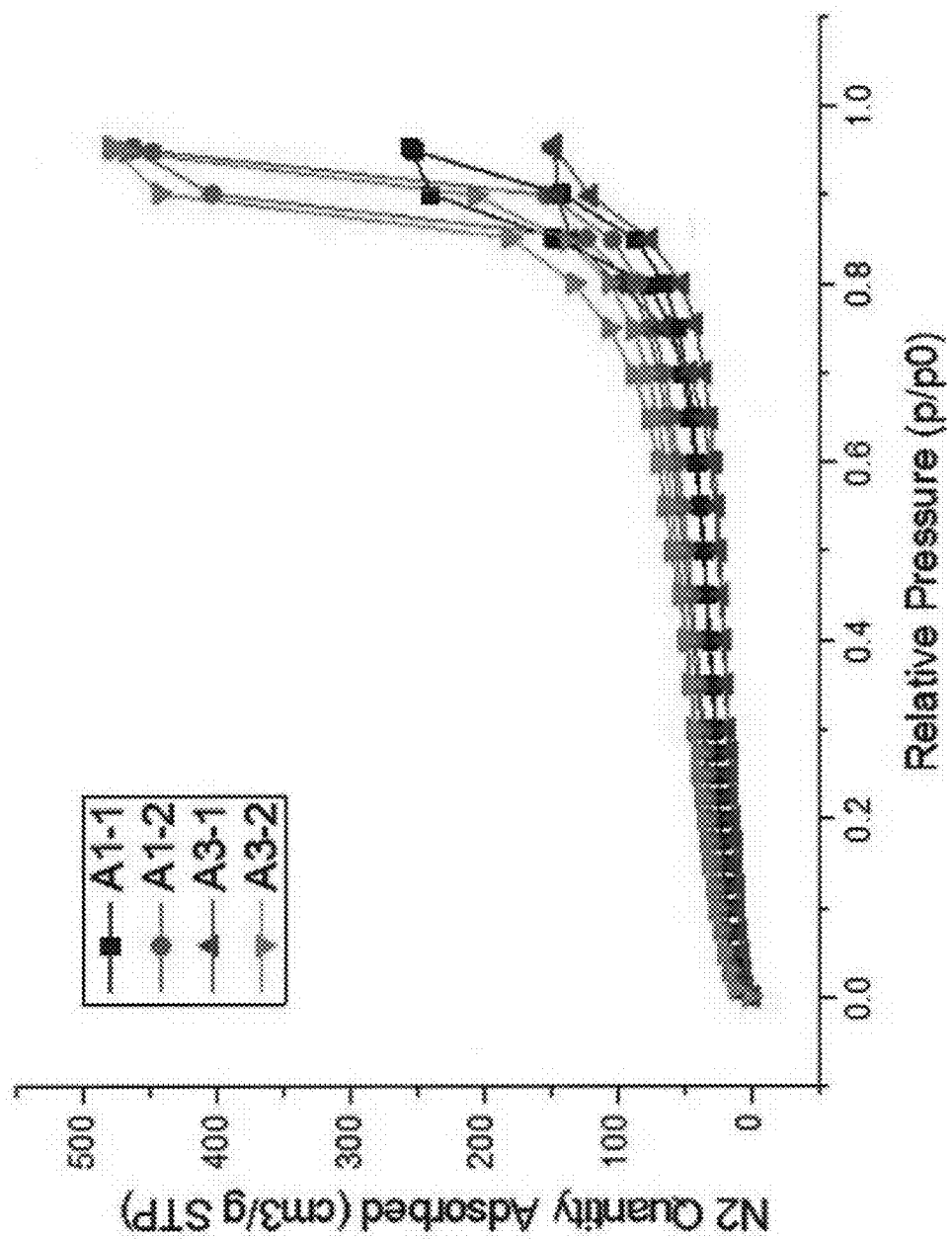
FIG. 7 is a graph showing the results of N2 physisorption (BET) experiments for CHEFS prepared using the instant invention, in accordance with the features of the present invention.
Figure 8C:
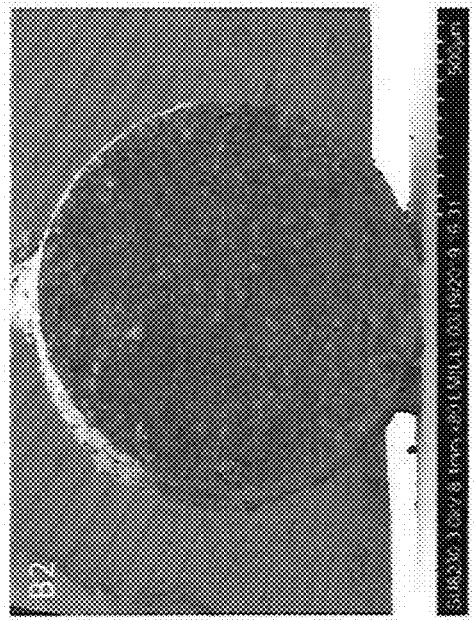
FIGS. 8C-8D are scanning electron microscopy images of CHEFS B2, in accordance with the features of the present invention.
Figure 8D:
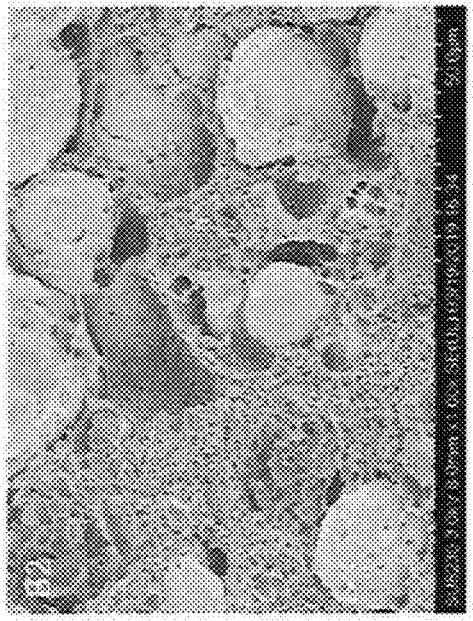
Figure 8A:
FIG. 8A-8B are scanning electron microscopy images of CHEFS B1, in accordance with the features of the instant invention.
Figure 8B:
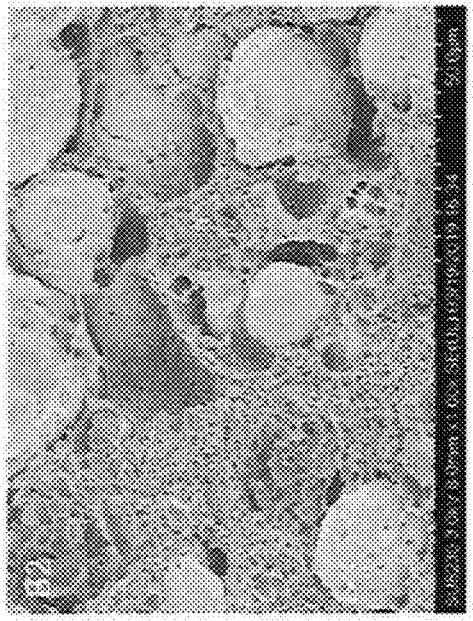

To further characterize the porosity of the CHEFS fibers after water or solvent exchange, pore size analysis was performed using $N_2$ physisorption (BET) experiments. The results of said experiments are shown in FIG. 7. Differences in hysteresis curves shown in FIG. 7 indicate that solvent exchanged fibers (A1-2 and A3-2) both have larger macropore volume compared to CHEFS fibers of the same composition that were water exchanged. (A1-1 and A3-1).

In order to optimize BIAS dispersion in the CHEFS fiber and maximize $CO_2$ sorption capacity, two new CHEFS fibers were generated using vortex mixing for one fiber (B1) and bath sonication for 30 minutes (B2). The composition of B1 and B2 fibers are listed in Table 3 below and correspond closely with fiber A3 above. FIGS. 8A-D show scanning electron microscopy images of fibers B1 and B2. The CHEFS fibers shown in FIGS. 8A-D are approximately 10 mm in length, and have a diameter of approximately 1.0 mm. These dimensions are exemplary and not meant to be limiting. Said dimensions can be customized to any length and diameter desired by a user.

TABLE 3

| FIBER | CA (grams) | PVP (grams) | NMP (grams) | H2O (grams) | BIAS (grams) |
|---|---|---|---|---|---|
| B1 | 1.2420 | 0.504 | 8.512 | 1.50 | 2.8003 |
| B2 | 1.2421 | 0.503 | 8.512 | 1.50 | 2.8014 |
| M35 | 1.38 | 0.58 | 9 | 1 | 2.15 |
| 53a | 2.125 | 2.2 | 18.8 | 18.75 | 3 |
| Hollow-53a | 2.125 | 2.2 | 18.8 | 18.75 | 3 |

Figure 9B:
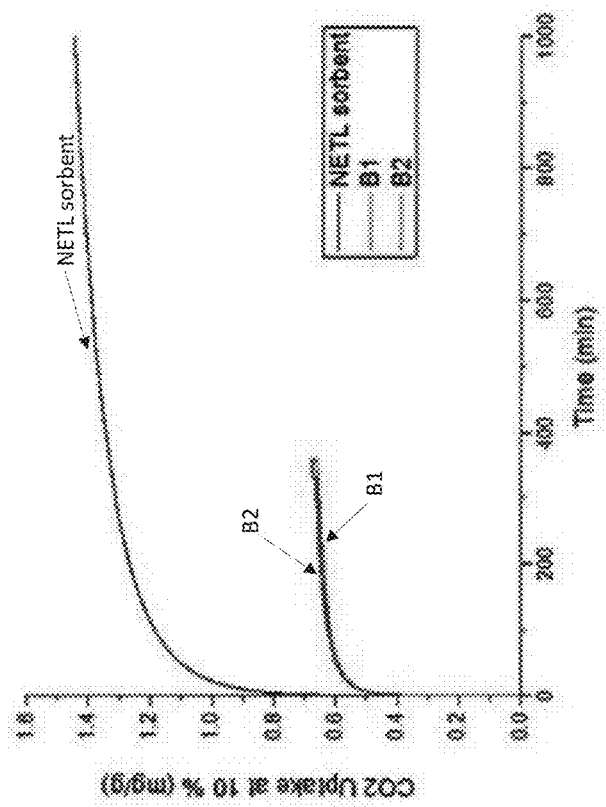
FIGS. 9A-9B are graphs showing CO2 uptake measurements of CHEFS, in accordance with the features of the present invention.

The $CO_2$ uptake were tested for the six solvent CHEFS fibers (A1-1, A1-2, A3-1, A3-2, B1, and B2) described, supra. The tests were carried out by flowing 10% $CO_2$ in $N_2$ at 35° C. over the sorbents in a TGA, after pretreating the fibers for 2 hours at 110° C. in $N_2$ flow. Results of these tests are shown in Table 4 and FIGS. 9A and 9B. The $CO_2$ uptake of CHEFS fibers 53A, Hollow-53A, and M35 were tested at 14% $CO_2$ in $N_2$ at 60° C. also. The results of those tests are listed in Table 4 and shown in FIG. 10.

TABLE 4

| Material | CO$_2$ Uptake (mmol/g material) | SiO$_2$ Loading from TGA (%) |
|---|---|---|
| BIAS particles | 1.44 | 59.1 |
| A1-1 | 0.40 | 34.6 |
| A1-2 | 0.44 | 34.6 |
| A3-1 | 0.58 | 43.1 |
| A3-2 | 0.60 | 43.1 |
| B1 | 0.66 | 43.8 |
| B2 | 0.67 | 43.5 |
| M35 | 0.50 | ~34 |
| 53a-solid | 0.25 | ~34 |
| Hollow-53a | 0.21-hollow | ~34 |

Figure 9A:
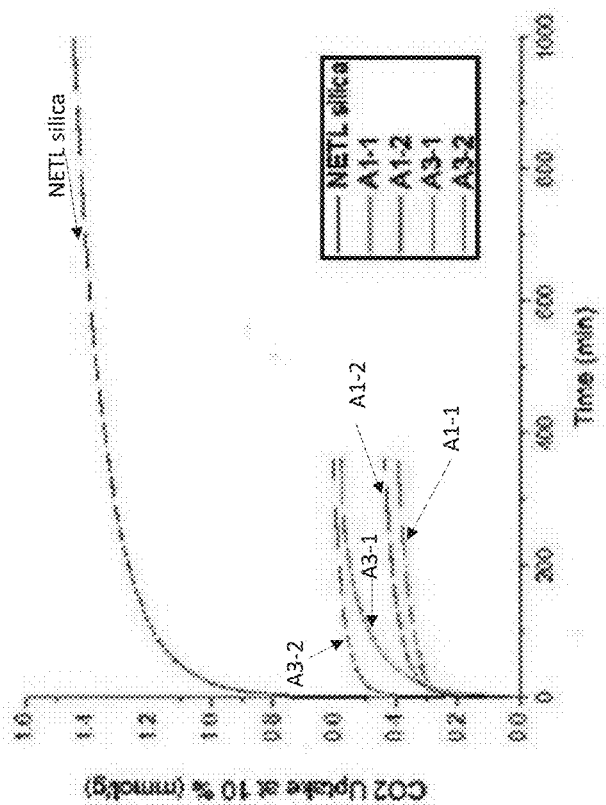
Figure 10:
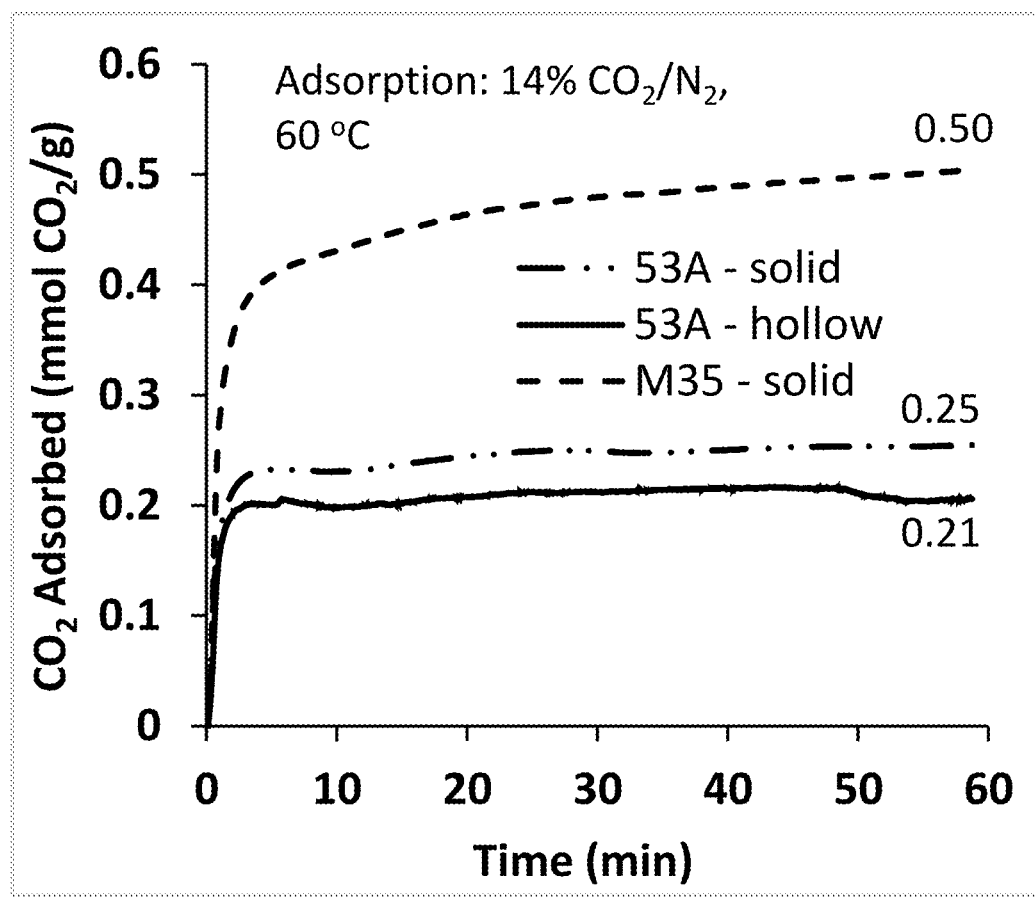
FIG. 10 is a graph showing CO2 uptake measurements of CHEFS, in accordance with the features of the present invention.
Figure 11A:
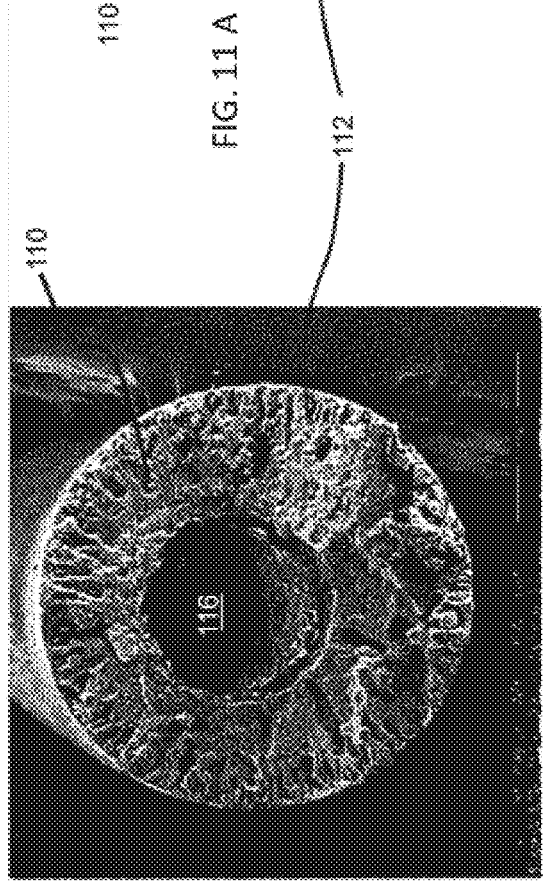
FIG. 11A-11B are scanning electron microscopy images of the hollow CHEFS 53a, in accordance with the features of the instant invention.
Figure 11B:
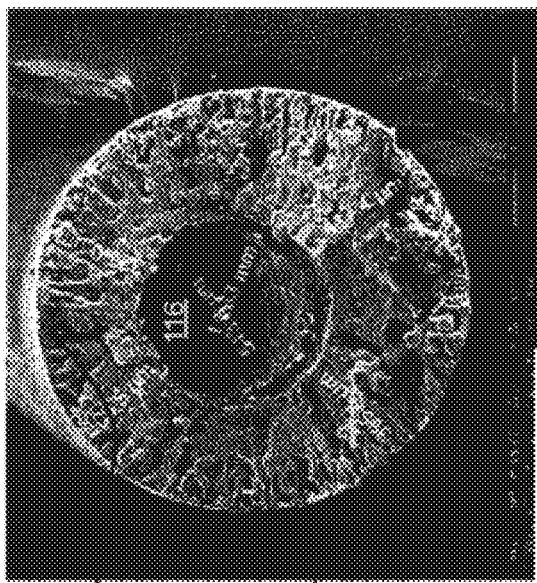
Figure 11C:
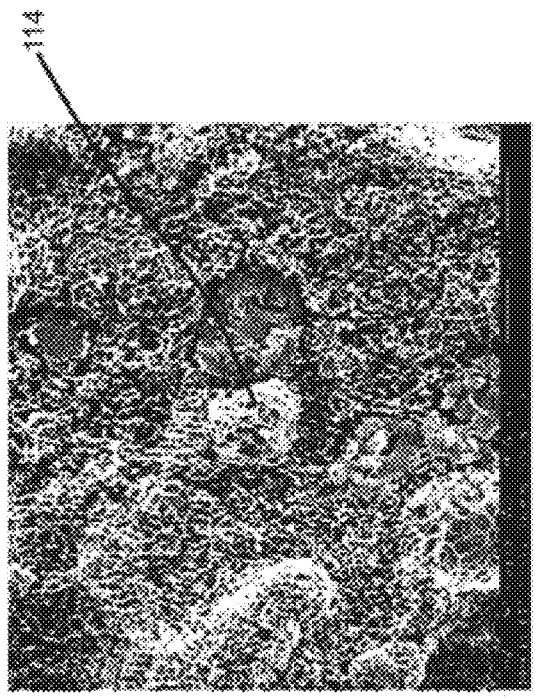
FIGS. 11C-11D are close-up scanning electron microscopy images of the of the hollow CHEFS 53a, in accordance with the features of the present invention.
Figure 11D:

As shown in Table 4 and FIGS. 9A-96, and FIG. 10, the CHEFS fibers all exhibit lower $CO_2$ uptake than the BIAS sorbent. Table 5 shows a comparison between experimental $CO_2$ uptakes versus theoretical $CO_2$ uptakes of CHEFS fibers. Blank cells represent data not collected or calculated.

TABLE 5

| Material | CO$_2$ Uptake (mmol/g material) | Theoretical Equilibrium Uptake (TGA)(mmol/g) | Theoretical Uptake (no amine loss), (mmol/g) |
|---|---|---|---|
| Silica | 1.44 | 1.44 | 1.44 |
| B1 | 0.66 | 0.82 | 1.00 |
| B2 | 0.67 | 0.84 | 1.00 |
| A3-2 | 0.60 | 0.86 | 1.00 |
| M35 | 0.51 | | 0.71 |
| 53a | 0.25 | | 0.27 |
| Hollow-53a | .21 | | .27 |

This is primarily due to the loss of amine function groups from the sorbent during the synthesis method described, supra. A salient feature of the invention is a one-step procedure to generate CHEFS that retain amine groups of the BIAS used to generate the CHEFS. In an embodiment, generated CHEFS have less than 30% amine loss compared to the BIAS used to generate the CHEFS. This feature of the invention is surprising and unexpected as prior art methods to generate CHEFS result in 86% or more amine loss compared to starting BIAS materials. Amine loss was calculated for the tested CHEFS fibers using Equation 2 as follows.

$$\text{Amine Loss} = \frac{1 - \frac{\text{Target SiO}_2 \text{ Loading}}{\text{TGA SiO}_2 \text{ Loading}}}{\text{Target Amine Loading}} \quad \text{Equation 2}$$

Table 6 provides the calculated amine losses calculated from Equation 2. Blank cells represent data not collected or calculated.

TABLE 6

| Material | Target SiO$_2$ Loading (%) | SiO$_2$ loading from TGA (%) | Amine Loss (%) |
| --- | --- | --- | --- |
| B1 | 40.9 | 43.8 | 23.2 |
| B2 | 40.9 | 43.5 | 21.0 |
| M35 | 36.5 | | |
| 53a | 40 | | |
| Hollow-53a | 40 | | |

FIGS. 11A-11D depict SEM images of tested hollow 53A CHEFS fibers 110. As shown in those figures, BIAS particles 114 are distributed homogenously throughout the fiber. These example CHEFS feature walls 112 that are between approximately 300 and 420 μm thick with lumens 116 extending through the length of the CHEFS coaxial with the longitudinal axis of the CHEFS. The lumens 116 of the tested fibers 110 have a diameter of approximately 540 μm. The depicted fibers 110, 112 have an outer diameter of approximately 1.3 mm. These dimensions are exemplary and not meant to be limiting. The CHEFS can be made to any dimensions made possible by direct spinning or methods discovered to make CHEFS using the instant invention in the future.

Figure 12B:
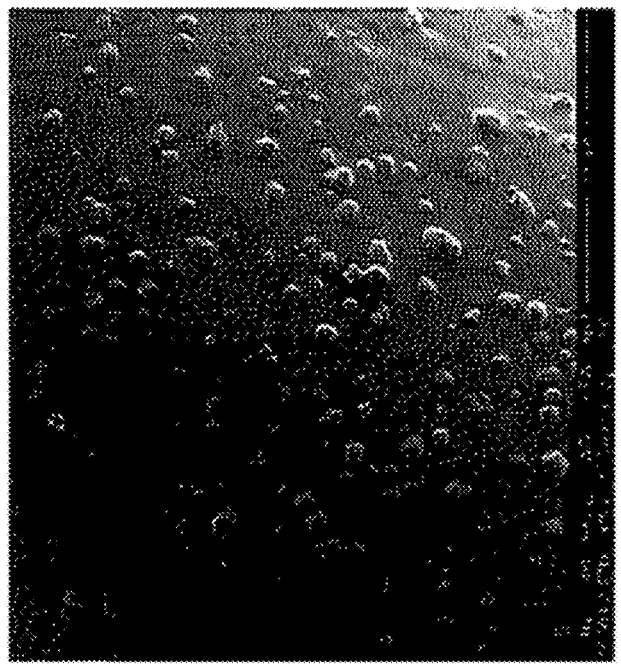
Figure 12A:
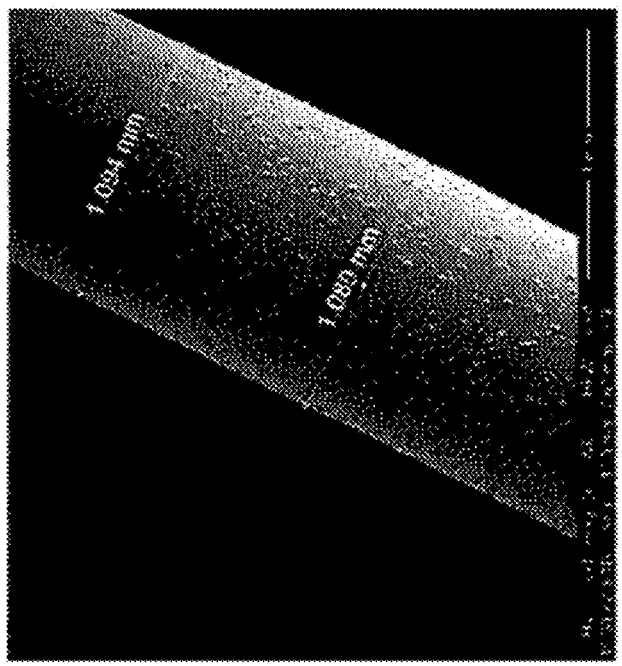

FIGS. 12A and 12B depict SEM images of the surface of the hollow 53A CHEFS fiber.

Figures 13A, 13B:
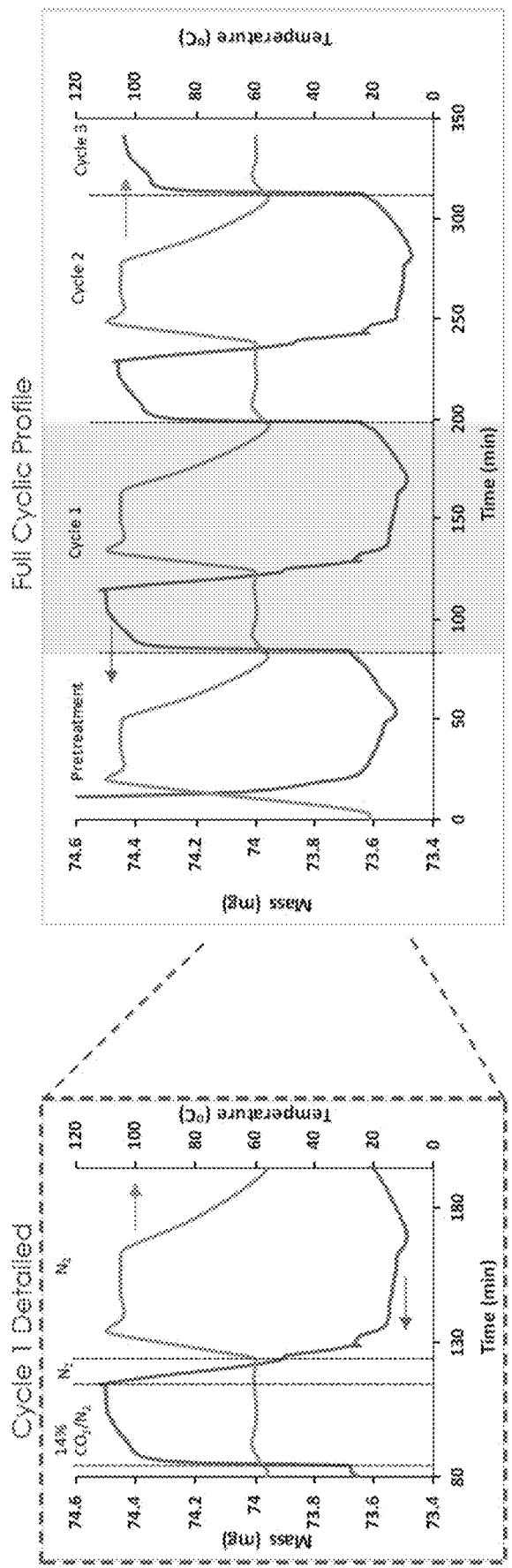
FIGS. 13A-13B are graphs showing the results of cyclic performance tests of CHEFS Hollow 53A, in accordance with the features of the present invention.

The cyclic performance of the Hollow-53A CHEFS fiber was tested over three cycles in 14% $CO_2$ in $N_2$. Fibers were pre-treated at 105° C. for 1 hour in flowing $N_2$ and were then cycled for $CO_2$ adsorption-desorption by: cooling to 60° C. and switching the flow to the $CO_2$ mix for 30 min for adsorption; switching back to $N_2$ for 10 min to purge gas phase $CO_2$; then heating to and holding at 105° C. for 30 min for $CO_2$ desorption followed by cooling down. A total of three cycles were performed to assess reusability. The performance of the Hollow-53A CHEFS fiber during these cycles is shown in FIG. 13A with FIG. 13B showing detail of the fiber's performance during the first cycle. FIGS. 13A and 138 show that the Hollow-53A CHEFS fiber is completely stable and regenerable at a $CO_2$ concentration of 0.25 mmol $CO_2$/g sorbent over three cycles. These figures further demonstrate the fast $CO_2$ adsorption and adsorption kinetics for the Hollow-53A CHEFS fiber, indicating that the fiber is suitable for RTSA.

Figure 14:
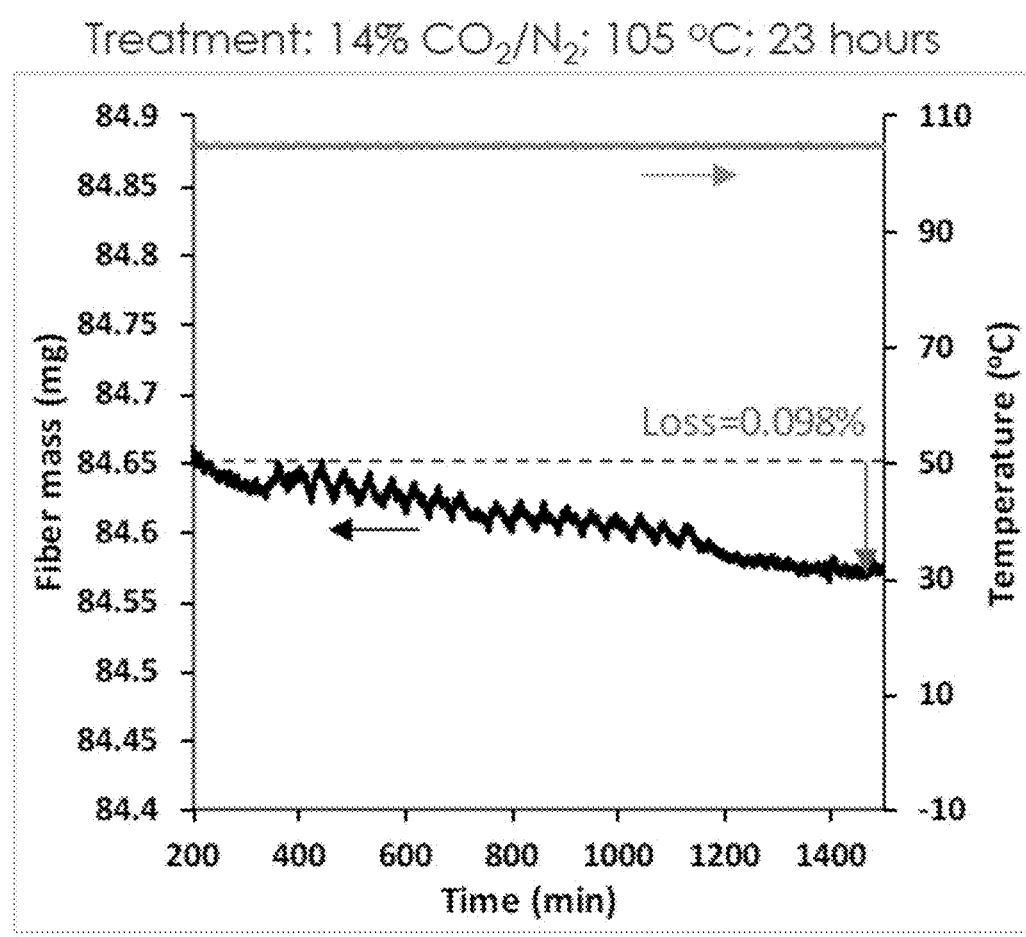
FIG. 14 is a graph showing the mass over time of a CHEF treated in 14% $CO_2$ in $N_2$ at 105° C. over 23 hours, in accordance with the features of the present invention.
Figure 15:
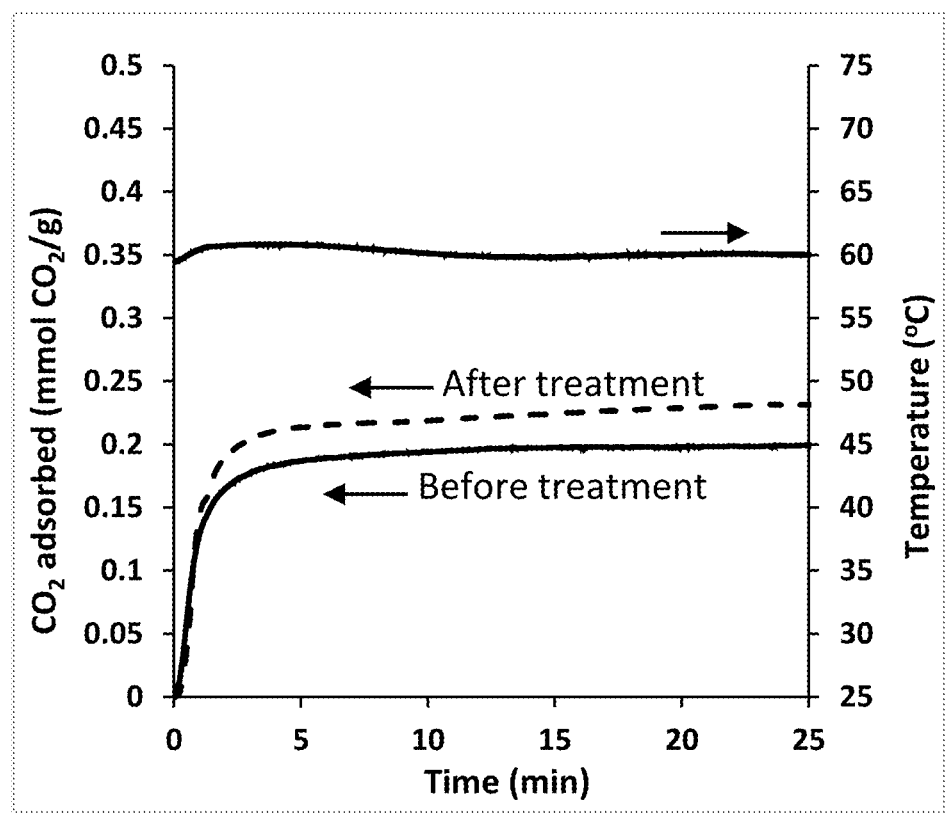
FIG. 15 is a graph showing the $CO_2$ adsorbed by a Hollow-53A CHEFS fiber in 14% $CO_2$ in $N_2$ at 60° C. over 25 minutes, before and after treatment in 14% $CO_2$ in $N_2$ at 105° C. over 23 hours for stability testing, in accordance with the features of the present invention.

FIG. 14 shows the mass of a Hollow-53A CHEFS fiber over 23 hours of continuous exposure to 14% $CO_2$ in $N_2$ at 105° C. Over the 23 hours, the sample lost only 0.098% mass. FIG. 15 shows the $CO_2$ adsorbed by a Hollow-53A CHEFS fiber in 14% $CO_2$ in $N_2$ at 60° C. over 25 minutes before and after the thermal treatment. The lack of a drop in $CO_2$ capacity shows high stability of the sorbent when exposed to high temperature in the presence of $CO_2$, which typically causes the $CO_2$ capacity of non-crosslinked PEI/silica particles to drop due to urea formation.

Water Treatment Detail

In an embodiment of the invention, the invented CHEFS fibers are suitable for removal of heavy metals from liquid streams. The final 53A CHEFS formulation is composed 61 wt % BIAS (12 wt % N—N-diglycidyl-4-glycidyloxyaniline/28 wt % PEI/60 wt % silica). A method for using the invented CHEFS fibers to remove heavy metals from a liquid comprises contacting a liquid containing a heavy metal with the CHEFS fiber, wherein the heavy metal adsorbs onto the CHEFS fiber. Three CHEFS formulations were tested for lead (Pb) uptake from a lead solution in water. The lead uptake tests comprised running 20 mL of the lead solution through a column randomly packed with approximately 0.5 g of CHEFS fiber pieces and analyzing effluent from the column. Results from the lead uptake tests are shown in Table 7.

TABLE 7

| | M43 | 53A |
| --- | --- | --- |
| Pb Conc in Fresh Solution (ppm) | 100 | 100 |
| Pb Conc. in Effluent (ppm) | 10~65 | 10~65 |
| Pb Uptake (%) | 45~90 | 45~90 |
| Pb Loading (wt %) | 0.3~0.7 | 0.3~0.7 |

Figure 16:
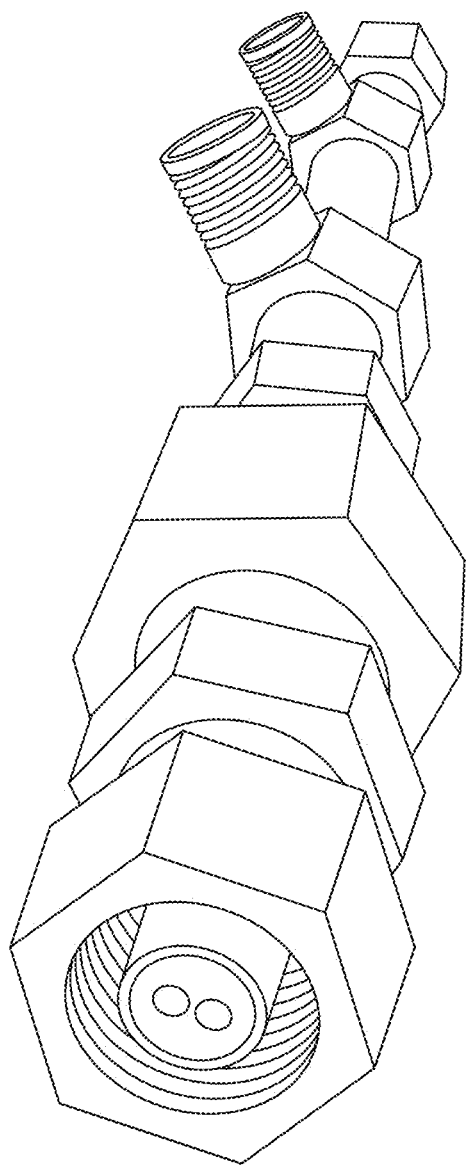
FIG. 16 is a photograph showing a module for contacting solutions containing metals to the invented CHEFS, in accordance with the features of the present invention.
Figure 17:
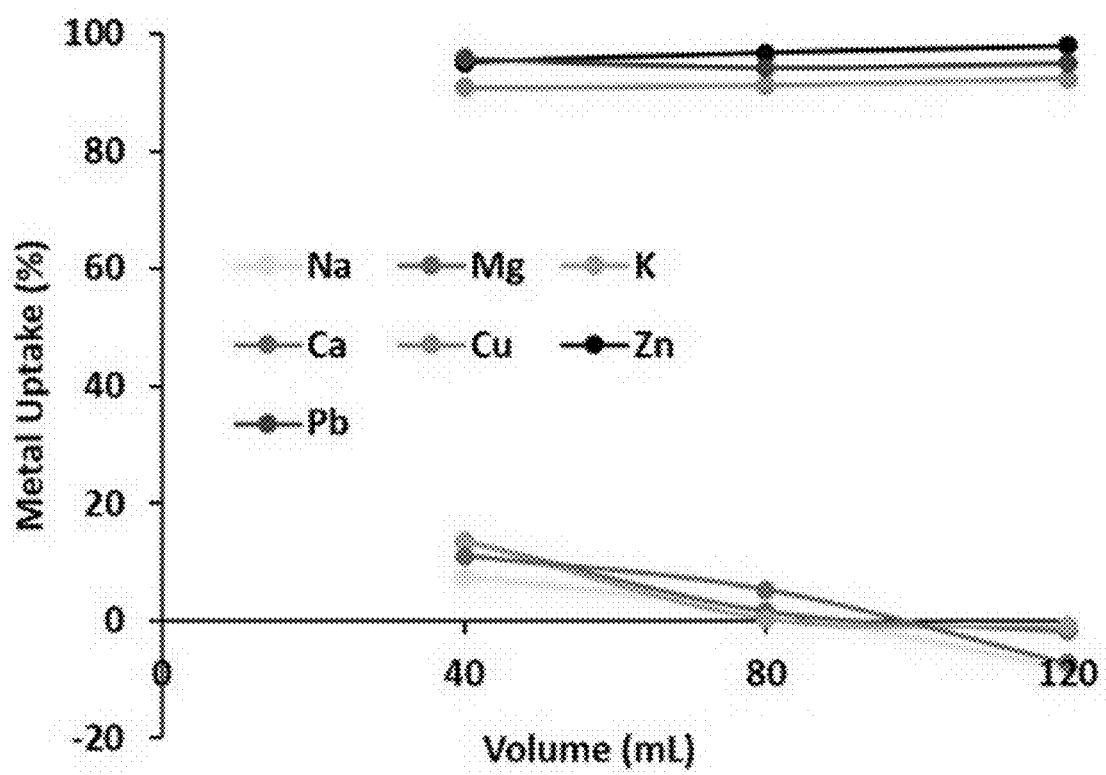
FIG. 17 is a graph showing the metal uptake results of a test using metal-laden water run through the module shown in FIG. 16, in accordance with the features of the present invention.

The invented CHEFS are suitable to remove other metals such as, Se, Cr. Hg, Cd, and others from different water sources, like concentrated leachates; flue gas desulfurization (FGD) water originating from coal fired power plant desulfurization process effluent; and acid mine drainages. A practical set-up used to test CHEFS metal removal from water involves securing the fibers into a hollow fiber module and flowing Pb-contaminated solution through the annulus to create cleaned water permeating through the outer fiber wall. By flowing 120 mL of 117 ppb Pb spiked tap water through a CHEFS module equipped with two thin wall hollow CHEFS fibers (FIG. 16), more than 95% of the Pb, 91% of Cu and 96% of Zn was removed despite the roughly 100/1 ratio of fouling metals/heavy metals. Small or 0% recovery of fouling metals suggests the low affinity of basic amines toward lower Lewis acid metals. The rapid adsorption kinetic and high adsorption capacity (>6 wt % Pb loading from capacity test), in together with the potential high packing density and large surface area of the module, may afford hollow CHEFS high productivity per unit volume for the removal of heavy metals from water sources. Beyond heavy metals, valuable rare earth elements and other critical species like Al, Co, Mn, and others can be captured by CHEFS. TABLE 8 gives the testing conditions for a trail of the module shown in FIG. 16 with the metal uptake % results shown in FIG. 17.

TABLE 8

| | |
| --- | --- |
| Fouling Materials Conc. (Na, Mg, K, Ca) | 85.6 ppm |
| Cu Conc. | 502 ppb |
| Zn Conc. | 223 ppb |
| Pb. Conc. | 117 ppb |
| Flowrate | 0.5 ml/min |
| Total Flow | 120 ml |
| Contact time on CHEFS | <15 sec |
| Pb Uptake | 95% |
| Pb Loading | >0.03 wt % |

In an embodiment, the invented CHEFS are used in a method to remove metals and/or a Lewis acid from a liquid. The method comprises contacting a plurality of CHEFS with a liquid containing one or more target moieties, wherein the target moieties comprise a metal, a Lewis acid, and combination thereof.

In an embodiment of the invention comprises a method for generating CHEFS comprising: generating the CHEFS from a dope. In an embodiment, the generating step comprises direct spinning a dope into CHEFS. In an embodiment, the dope comprises a BIAS, at least one polymer, and at least one solvent. In an embodiment, the BIAS comprises a polyamine immobilized onto silica via a crosslinker. In an embodiment the polyamine is selected from the group consisting of polyethylenimine, ethylenediamine, diethylenetriamine, triethylenetetramine, tetraethylenepentamine, polypropylenimine, pentaethylenehexamine, hexaethyleneheptamine, 1, 3-cyclohexanebis(methylamine), 4,4'-Methylenebis(cyclohexylamine), 3, 3'-Methylenedianiline, o-phenylenediamine, m-phenylenediamine, p-phenylenediamine, Tris(2-aminoethyl)amine, p-Xylylenediamine, 4-Chloro-o-phenylenediamine, N, N'-Dimethyl-1,3-propanediamine, N,N'-Diphenyl-p-phenylenediamine, N,N'-Diisopropyl-1, 3-propanediamine, polyvinyl amine, poly(allylamine), and combinations thereof. In an embodiment, the crosslinker is a moiety suitable for crosslinking a polyamine selected from the group consisting of epoxysilanes, aminosilanes, polyepoxides, acrylamide-based crosslinkers, and combinations thereof. In an embodiment, the crosslinker is an epoxysilane selected from the group consisting of 2-(3,4-epoxycydohexyl)ethyltriethoxysilane (ECTMS), 5,6-epoxyhexyltriethoxysilane, tetrakis[(epoxycycdohexypethyl]tetramethyl-cyclotetrasiloxane, epoxypropoxypropyl terminated polydimethylsiloxane, (epoxycyclohexylethyl)methylsiloxane]dimethylsiloxane copolymer, 1,3-bis[2-(3,4-epoxycyclohexyl)ethyl]tetramethyldisiloxane, (epoxypropyl)heptaisobutyl-t8-silsesquioxane, epoxypropoxypropyl methylsiloxane]-dimethylsiloxane, mono-(2,3-epoxy) propylether terminated polydimethylsiloxane, epoxycyclohexylethyl terminated polydimethylsiloxane, and combinations thereof. In an embodiment, the crosslinker is an aminosilane selected from the group consisting of 3-aminopropyltriethoxysilane, 3-(2-Aminoethylamino)propyldimethoxymethylsilane, 3-[2-(2-Aminoethylamino)ethylamino]propyltrimethoxysilane, Bis[3-(trimethoxysilyl) propyl]amine, N-[3-(Trimethoxysilyl)propyl]aniline, and 1-[3-(Trimethoxysilyl)propyl]urea; (3) Incorporating different silane-derived linkers, such as (3-Bromopropyl) trimethoxysilane, (3-Iodopropyl)trimethoxysilane, (3-Mercaptopropyl)trimethoxysilane, (3-Chloropropyl) trimethoxysilane, 3-(Trimethoxysilyl)propyl methacrylate, 3-Glycidyloxypropyl)trimethoxysilane, and combinations thereof. In an embodiment, the crosslinker is a polyepoxide selected from the group consisting of bisphenyl A diglycidyl ether, N—N-diglycidyl-4-glycidyloxyanaline, 4,4'-methylenebis(N,N-diglycidylaniline), Triglycidyl trimethylolpropane ether, and combinations thereof. In an embodiment, the crosslinker is an acrylamide-based crosslinker selected from the group consisting of acrylamide, acrylamide, N,N'-Methylenebis(acrylamide), and combinations thereof. In an embodiment, the polyamine is polyethylenimine and the crosslinker is N—N-diglycidyl-4-glycidyloxyaniline. In an embodiment, the polyamine is polyethylenimine and the crosslinker is 2-(3,4-epoxycyclohexyl)ethyltriethoxysilane. In an embodiment, the produced CHEFS retain amine functional groups. In an embodiment, the produced CHEFS have no more than 30% amine loss compared to the BIAS. In an embodiment, the at least one polymer comprises a combination of PVP and CA.

In another embodiment, the invention comprises a method for generating CHEFS having amine functional groups comprising: generating a dope comprising a BIAS with amine groups, at least one polymer, and at least one solvent; and forming CHEFS from the dope, wherein the generated CHEFS have no more than 30% amine loss compared to the BIAS. In an embodiment, the BIAS comprises a silica substrate supporting polyethylenimine crosslinked with a crosslinker. In an embodiment, the produced CHEFS are suitable for use in $CO_2$ capture processes without the addition of further amine functionality. In an embodiment, the produced CHEFS are suitable for use in $CO_2$ capture processes without the addition of further amine functionality.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A method for generating CHEFS comprising:
    direct spinning a dope into CHEFS, wherein the dope comprises a BIAS, at least one polymer, and at least one solvent, and wherein the BIAS comprises a polyamine immobilized onto silica via a crosslinker.

2. The method of claim 1 wherein the polyamine is selected from the group consisting of polyethylenimine, ethylenediamine, diethylenetriamine, triethylenetetramine, tetraethylenepentamine, polypropylenimine, pentaethylenehexamine, hexaethyleneheptamine, 1, 3-cyclohexanebis(methylamine), 4,4'-Methylenebis(cyclohexylamine), 3, 3'-Methylenedianiline, o-phenylenediamine, m-phenylenediamine, p-phenylenediamine, Tris(2-aminoethyl)amine, p-Xylylenediamine, 4-Chloro-o-phenylenediamine, N,N'-Dimethyl-1,3-propanediamine, N,N'-Diphenyl-p-phenylenediamine, N,N'-Diisopropyl-1,3-propanediamine, polyvinyl amine, poly(allylamine), and combinations thereof.

3. The method of claim 2 wherein the crosslinker is a moiety suitable for crosslinking a polyamine selected from the group consisting of epoxysilanes, aminosilanes, polyepoxides, acrylamide-based crosslinkers, and combinations thereof.

4. The method of claim 3 wherein the crosslinker is an epoxysilane selected from the group consisting of 2-(3,4-epoxycyclohexyl)ethyltriethoxysilane (ECTMS), 5,6-epoxyhexyltriethoxysilane, tetrakis[(epoxycyclohexypethyl] tetramethylcyclotetrasiloxane, epoxypropoxypropyl terminated polydimethylsiloxane, (epoxycyclohexylethyl) methylsiloxane] dimethylsiloxane copolymer, 1,3-bis[2-(3, 4-epoxycyclohexyl)ethyl]tetramethyldisiloxane, (epoxypropyl)heptaisobutyl-t8-silsesquioxane, epoxypropoxypropyl) methylsiloxane]-dimethylsiloxane, mono-(2,3-epoxy) propylether terminated polydimethylsiloxane, epoxycyclohexylethyl terminated polydimethylsiloxane, and combinations thereof.

5. The method of claim 3 wherein the crosslinker is an aminosilane selected from the group consisting of 3-aminopropyltriethoxysilane, 3-(2-Aminoethylamino)propyldimethoxymethylsilane, 3-[2-(2-Aminoethylamino)ethylamino] propyltrimethoxysilane, Bis[3-(trimethoxysilyl)propyl] amine, N-[3-(Trimethoxysilyl)propyl]aniline, and 1-[3-(Trimethoxysilyl)propyl]urea; (3) Incorporating different silane-derived linkers, such as (3-Bromopropyl)trimethoxysilane, (3-Iodopropyl)trimethoxysilane, (3-Mercaptopropyl)trimethoxysilane, (3-Chloropropyl)trimethoxysilane, 3-(Trimethoxysilyl)propyl methacrylate, 3-Glycidyloxypropyl)trimethoxysilane, and combinations thereof.

6. The method of claim 3 wherein the crosslinker is a polyepoxide selected from the group consisting of bisphenyl A diglycidyl ether, N—N-diglycidyl-4-glycidyloxyanaline, 4,4'-methylenebis(N,N-diglycidylaniline), Triglycidyl trimethylolpropane ether, and combinations thereof.

7. The method of claim 3 wherein the crosslinker is an acrylamide-based crosslinker selected from the group consisting of acrylamide, acrylamide, N,N'-Methylenebis(acrylamide), and combinations thereof.

8. The method of claim 1 wherein the polyamine is polyethylenimine and the crosslinker is N-N-diglycidyl-4-glycidyloxyaniline.

9. The method of claim 1 wherein the polyamine is polyethylenimine and the crosslinker is 2-(3,4-epoxycyclohexyl)ethyltriethoxysilane.

10. The method of claim 1 wherein the produced CHEFS retain amine functional groups.

11. The method of claim 1 wherein the produced CHEFS have no more than 30% amine loss compared to the BIAS.

12. The method of claim 1 wherein the at least one polymer comprises a combination of PVP and CA.

13. A method for generating CHEFS having amine functional groups comprising:
    a) generating a dope comprising a BIAS with amine groups, at least one polymer, and at least one solvent; and
    b) forming CHEFS from the dope, wherein the generated CHEFS have no more than 30% amine loss compared to the BIAS.

14. The method of claim 13 wherein the BIAS comprises a silica substrate supporting polyethylenimine crosslinked with a crosslinker.

15. The method of claim 13 wherein the produced CHEFS are suitable for use in $CO_2$ capture processes without the addition of further amine functionality.

16. The method of claim 1 wherein the produced CHEFS are suitable for use in $CO_2$ capture processes without the addition of further amine functionality.

* * * * *